United States Patent
Mehdaoui et al.

(10) Patent No.: US 12,306,137 B2
(45) Date of Patent: May 20, 2025

(54) DEVICE FOR DETERMINING FIRSTLY A HEAT CONDUCTIVITY AND/OR THE SPECIFIC HEAT CAPACITY OF A GAS MIXTURE, AND SECONDLY A DENSITY AND/OR A VISCOSITY OF THE GAS MIXTURE

(71) Applicant: TrueDyne Sensors AG, Reinach (CH)

(72) Inventors: Alexandre Mehdaoui, Basel (CH);
Christof Huber, Bern (CH);
Anastasios Badarlis, Birsfelden (CH);
Josua Ritter, Reinach (CH)

(73) Assignee: TrueDyne Sensors AG, Reinach (CH)

( * ) Notice: Subject to any disclaimer, the term of this patent is extended or adjusted under 35 U.S.C. 154(b) by 348 days.

(21) Appl. No.: 18/004,826

(22) PCT Filed: Jun. 21, 2021

(86) PCT No.: PCT/EP2021/066742
§ 371 (c)(1),
(2) Date: Jan. 9, 2023

(87) PCT Pub. No.: WO2022/008212
PCT Pub. Date: Jan. 13, 2022

(65) Prior Publication Data
US 2023/0304967 A1   Sep. 28, 2023

(30) Foreign Application Priority Data

Jul. 10, 2020 (DE) .................. 10 2020 118 341.0
Oct. 9, 2020 (DE) .................. 10 2020 126 601.4

(51) Int. Cl.
*G01N 29/02* (2006.01)
*G01N 29/036* (2006.01)

(52) U.S. Cl.
CPC ......... *G01N 29/022* (2013.01); *G01N 29/036* (2013.01); *G01N 2291/021* (2013.01);
(Continued)

(58) Field of Classification Search
CPC ............... G01N 29/036; G01N 29/022; G01N 2291/0256; G01N 2291/02818; G01N 2291/021; G01N 2291/0427
See application file for complete search history.

(56) References Cited

U.S. PATENT DOCUMENTS 4,262,523 A    4/1981 Stansfeld
6,311,549 B1 * 11/2001 Thundat .................. G01N 11/16
                                                                73/54.24
(Continued)

FOREIGN PATENT DOCUMENTS

DE    102019123874 A1    3/2021
WO       2017063795 A1    4/2017
(Continued)

OTHER PUBLICATIONS

Huber, Christof et al., Gas Density and Viscosity Measurement with a Microcantilever for Online Combustion Gas Monitoring, Sensoren und Messysteme Symposium, Jun. 26-27, 2018, pp. 34-37, Nuremberg, Germany.
(Continued)

*Primary Examiner* — Francis C Gray
(74) *Attorney, Agent, or Firm* — Christopher R. Powers; Endress+Hauser (USA) Holding, Inc.

(57) ABSTRACT

A device includes: a chip, which includes a oscillatable cantilever with a first piezoelectric transducer for exciting cantilever oscillation, wherein the first cantilever extends into a cavity of the chip; a cantilever temperature sensor in an end section of the cantilever; a second temperature sensor spaced from the cantilever; a heating element located in the
(Continued)

free end section of the cantilever and separated from the second temperature sensor by at least one cavity section; and an evaluation unit for determining density and viscosity as well as thermal conductivity and specific heat capacity of a gas mixture based respectively on oscillation characteristics of the cantilever and measured values of gas temperature from the cantilever temperature sensor, the second temperature sensor and a power consumption of the heating element.

17 Claims, 1 Drawing Sheet

(52) U.S. Cl.
CPC .............. $G01N\ 2291/0256$ (2013.01); $G01N\ 2291/02818$ (2013.01); $G01N\ 2291/0427$ (2013.01)

(56) References Cited

U.S. PATENT DOCUMENTS

| | | | |
|---|---|---|---|
| 2004/0220753 A1* | 11/2004 | Tabe | G01N 33/0075 702/32 |
| 2016/0290849 A1 | 10/2016 | Badarlis et al. | |
| 2023/0221288 A1* | 7/2023 | Rosenheim | G01N 11/16 73/54.43 |

FOREIGN PATENT DOCUMENTS

| | | | |
|---|---|---|---|
| WO | 2017131670 A1 | 8/2017 | |
| WO | 2018082875 A1 | 5/2018 | |
| WO | WO-2021255101 A1 * | 12/2021 | G01F 23/296 |

OTHER PUBLICATIONS

Yu, Haitao et al., Resonant-cantilever bio/chemical sensors with an integrated heater for both resonance exciting optimization and sensing repeatability enhancement, Journal of Micromechanics and Microengineering vol. 19, 2009, pp. 1-10, IOP Publishing, UK.

Gustafsson, Silas E. et al., Transient hot-strip method for simultaneously measuring thermal conductivity and thermal diffusivity of solids and fluids, Journal of Physics D: Applied Physics, vol. 12, 1979, pp. 1411-1421.

Woodfield, P.L. et al., Determining Thermal Conductivity and Thermal Diffusivity of Low-Density Gases Using the Transient Short-Hot-Wire Method, Int J Thermophys, 2008, vol. 29, pp. 1299-1320, Published online, Research Center for Hydrogen Industrial Use and Storage, National Institute of Advanced Industrial Science and Technology, Fukuoka, Japan.

* cited by examiner

DEVICE FOR DETERMINING FIRSTLY A HEAT CONDUCTIVITY AND/OR THE SPECIFIC HEAT CAPACITY OF A GAS MIXTURE, AND SECONDLY A DENSITY AND/OR A VISCOSITY OF THE GAS MIXTURE

CROSS-REFERENCE TO RELATED APPLICATIONS

The present application is related to and claims the priority benefit of German Patent Application No. 10 2020 118 341.0, filed on Jul. 10, 2020, German Patent Application No. 10 2020 126 601.4, filed Oct. 9, 2020, and International Patent Application No. PCT/EP2021/066742, filed Jun. 21, 2021, the entire contents of which are incorporated herein by reference.

TECHNICAL FIELD

The present disclosure relates to a device for determining, firstly, a thermal conductivity and/or specific heat capacity of a gas mixture and, secondly, a density and/or a viscosity of the gas mixture.

BACKGROUND

Based on density and viscosity, via a correlation method, the energy content or the Wobbe index of a combustible gas can be determined, such as described, for example, in the international publication WO 2017 063 795 A1. A microsystem device for ascertaining the viscosity and the density as well as a trace gas concentration, or the moisture, of a gas is disclosed, for example, in the as yet unpublished patent application DE 10 2019 123 874.9.

Based on the above mentioned parameters, density and viscosity alone, however, the influence of hydrogen is insufficiently precisely taken into consideration. This is without problem as long as hydrogen content in the investigated gas mixtures is negligible. This condition is in the case of the foreseeable increasing importance of hydrogen less frequently satisfied. When, however, supplementally the thermal conductivity of the gas mixture is ascertained, also the hydrogen fraction can be correctly determined, such as is described in the international publication WO 2018 082 875 A1. A system for ascertaining the density of a gas mixture with a vibronic sensor and other parameters of the gas mixture, among these also the thermal conductivity, using external sensors is disclosed in the publication WO 2017 131 670 A1. The system described there has, however, a large space requirement and is too expensive for a large number of applications. It is, therefore, an object of the invention to provide a remedy in such case.

SUMMARY

The object is achieved by the device according to the present disclosure.

The device of the invention for determining, firstly, a thermal conductivity and/or specific heat capacity of a gas mixture and, secondly, a density and/or a viscosity of the gas mixture comprises: a chip prepared from a semiconductor wafer, especially an SOI wafer, and containing at least a first oscillatable cantilever with a first piezoelectric transducer, which serves for exciting an oscillation of the cantilever with a first frequency, wherein the chip has a cavity, into which the first cantilever extends with an oscillatable free end section; at least a first cantilever side temperature sensor element embodied in the free end section of the first cantilever and having a temperature-dependent resistance value for registering temperature of the gas mixture; at least a second temperature sensor element arranged spaced from the first cantilever and having a temperature-dependent resistance value for registering temperature of the gas mixture; at least a first heating element embodied in the free end section of the cantilever, wherein at least one section of the cavity extends between the first heating element and the second temperature sensor element; and an evaluation and/or computer unit, which is adapted, based on the oscillation characteristics of the cantilever, to determine the density and viscosity of the gas mixture, and, based on measured values of temperature of the first cantilever side temperature sensor element and the second temperature sensor element as well as the power consumption of the heating element, to determine the thermal conductivity and/or specific heat capacity of the gas mixture.

The determination of two thermophysical variables, thus, both the thermal conductivity as well as also specific heat capacity, provides, on the one hand, a certain redundancy in the determining of the heating value and, therewith, an increased reliability. Fundamentally, there is provided therewith in the case of determining the composition of binary, ternary or quaternary gas mixtures more information on the involved gases and their concentrations compared with the method described in WO 2018 082 875 A1, this in turn enabling a more exact determining of the gas composition.

In a further development of the invention, the chip includes a second oscillatable cantilever with a second piezoelectric transducer, which serves for exciting an oscillation with a second frequency, wherein the second cantilever extends with an oscillatable free end section into the cavity and can be exposed to the gas mixture.

In a further development of the invention, a second heating element is arranged in the free end section of the second cantilever.

The cavity, into which the cantilevers extend, can comprise, for example, a rectangle with edge lengths no longer than 2 mm, especially no longer than 1 mm, wherein the cantilevers extend with a length of some 100 µm, for example, 300 µm to 500 µm, into the cavity, wherein the longitudinal axes of the cantilevers have a separation from one another of some 10s to, for example, 20 10s or 200 µm. The cantilevers can especially extend into the cavity from opposite sides of the cavity. The heating and temperature sensor elements of the different cantilevers can, for example, be sectioned by a shared transverse plane, which extends perpendicularly to the cantilever longitudinal axes. This means that the relevant thermal coupling between the heat and temperature sensor elements of different cantilevers is by way of the gas mixture. Since the separation is very small, the time scales for the heat transport between heat and temperature sensor elements are correspondingly short, this in turn enabling a quick reaction time of the measuring arrangement to a change of the composition of the gas mixture.

In a further development of the invention, a second cantilever side temperature sensor element for registering temperature of the gas mixture with a temperature-dependent resistance value is arranged in the free end section of the second cantilever.

In a further development of the invention, the chip includes an edge region, which surrounds the cavity, wherein a reference temperature sensor element is arranged in the edge region, wherein at least one section of the cavity extends between the reference temperature sensor element and the free end sections.

According to another development of the invention, the piezoelectric transducers of the cantilevers are arranged, in each case, between the section of the edge region, where the cantilever is connected with the chip, and the cantilever side temperature sensor element, or heating element.

In a further development of the invention, the evaluation and/or computer unit is adapted to use temperature measured values of the reference temperature sensor element as temperature measured values of the second temperature sensor element.

In a further development of the invention, the evaluation and/or computer unit is adapted to use temperature measured values of the second cantilever side temperature sensor element as temperature measured values of the second temperature sensor element.

In a further development of the invention, the evaluation and/or computer unit is adapted to determine the thermal conductivity of the gas mixture in steady state or in a transient method.

An example of determining thermal conductivity in steady state is described, for example, in product information of the XEN-SP3880 of the firm, Xensor.

A determining of the thermal conductivity in a transient method is described, for example, in Woodfield et al., Int. J. Thermophysics (2008) 29: 1299-1320 and in Gustafsson et al., 1979, Transient hot-strip method for simultaneously measuring thermal conductivity and thermal diffusivity of solids and fluids. Journal of Physics D: Applied.

A thermal conductivity measurement basically assumes negligible relative movement between the medium and the measuring arrangement. In the present measuring arrangements, however, at least one heating element involved in the measurement and one temperature sensor element involved in the measurement are arranged on an oscillatable cantilever. The heat transport must travel through a shear wave as the cantilever oscillates. The extent of this disturbance of the measurement corresponds to the penetration depth of the shear wave into the gas mixture. This can be estimated with the thickness δ of the viscous boundary layer according to $$\delta = \sqrt{\frac{\eta/\rho}{f}}$$

wherein η and ρ are, respectively, dynamic viscosity and density of the medium, and f is the oscillation frequency of the cantilever. In the case of frequencies in the range from 10 kHz to 100 kHz and pressure between 0.1 MPa and 1 Mpa, penetration depths between some few μm and, for instance, 100 μm result, for example, for gases from a list comprising Ar, N2, CH4, CO2, He, and H2. Depending on separation between the heat and temperature sensor elements in the thermal conductivity measurement, the penetration depths can, consequently, be disregarded or not. When the penetration depth amounts, for example, to less than 1% of the separations, sufficiently exact results are possible, so that the thermal conductivity measurement can be performed in the case of oscillating cantilever. When, in contrast, the penetration depth amounts to 10% of the separation or more, it can, depending on accuracy requirement, be appropriate to perform the thermal conductivity measurement in oscillation pauses with resting cantilever. Furthermore, the influence of the oscillations in the case of thermal conductivity measurement can be ascertained by performing the measuring of the thermal conductivity with oscillating cantilever and then with resting cantilever, wherein, from the deviations between the results of measurement, correction values be ascertained, with which then preliminary results of a thermal conductivity measurement in the case of oscillating cantilever can be corrected. The correction values can be ascertained, for example, in the context of a factory calibration and, in given cases, described by a corresponding model. Equal procedures can be followed in the ongoing measurement operation, periodically or result-controlled, for example, after establishing a change of the gas composition based on the measured values for density, viscosity and thermal conductivity.

In a further development of the invention, the evaluation and/or computer unit is adapted to ascertain specific heat capacity of the gas mixture in a method using variable heating power in the first heating element, wherein temperature as a function of time for the second temperature sensor element is evaluated in reaction to the heating power as a function of time for the first heating element, in order to ascertain a product of specific heat capacity and density of the gas mixture. Methods for ascertaining specific heat capacity are basically known and are described, for example, in the above mentioned articles of Woodfield et al. and Gustafsson et al.

In a first embodiment of this additional development of the invention, a method step is provided for evaluating the step function response of the second temperature sensor element to a heating power step function of the first heating element.

In a second embodiment of this additional development of the invention, temperature as a function of time for the second temperature sensor element is evaluated as regards phase and amplitude in reaction to a harmonic exciting of the first heating element.

In a further development of the invention, the evaluation and/or computer unit is adapted to determine specific heat capacity by means of division of the product by the density ascertained based on the oscillation frequency of one of the cantilevers.

In a further development of the device of the invention, at least one cantilever includes a functionalized surface for selective adsorption of a component, especially water, of a gas mixture surrounding the device, wherein the evaluation and/or computer unit is adapted, furthermore, to influence the amount of the adsorbed component by means of the heating element of the cantilever and based on the measured frequency of the oscillating cantilever compared with at least one reference frequency to ascertain the amount of the adsorbed component.

In a further development of the invention, the at least one reference frequency comprises a frequency of the cantilever in the case of complete desorption of the component and/or the frequency of a non-functionalized cantilever.

In a further development of the invention, the chip has a function-dependent, structured layer sequence, which is prepared on the SOI substrate having an oxide layer, an adhesion-promoting layer, a first electrode layer; a piezoelectric layer, a second electrode layer and a passivation layer, wherein the piezoelectric transducer or the piezoelectric transducer regions comprises, or comprise, the two electrode layers and the piezoelectric layer, wherein the temperature sensor elements are formed, in each case, by structuring a region of an electrode layer, especially the first electrode layer, wherein the first heating element, or the heating elements, is/are formed, in each case, by structuring a region of one of the electrode layers, especially the second electrode layer, wherein the adhesion-promoting layer and the piezoelectric layer include especially aluminum nitride, wherein the first and the second electrode layers include especially platinum, and wherein the passivation layer includes especially aluminum oxide. The method steps for preparing and structuring this layer sequence are described in the as yet unpublished patent application DE 10 2019 123 874.9. The passivation layer not mentioned there can be prepared, for example, by means of ALD (atomic layer deposition).

DETAILED DESCRIPTION

Figure 1:
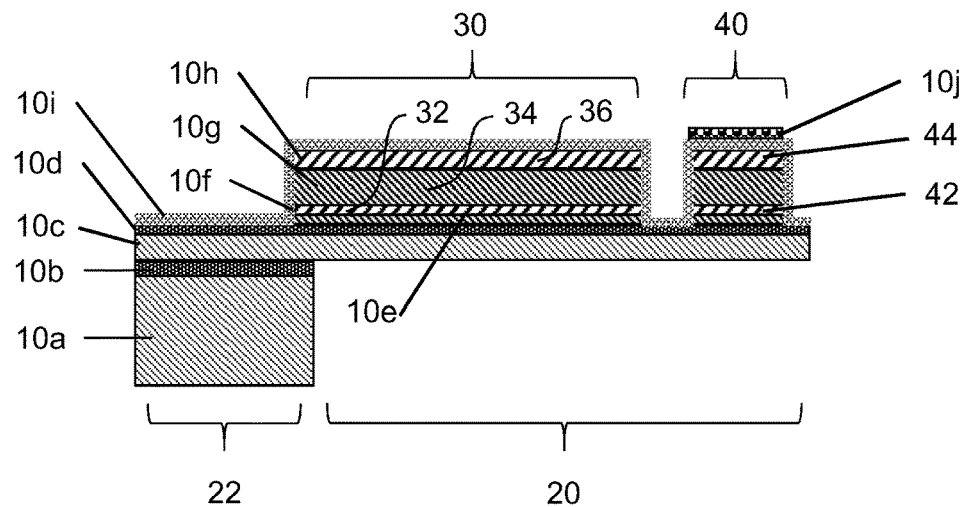
FIG. 1 shows a schematic longitudinal section of a cantilever of an example of an embodiment of a device of the present disclosure.

FIG. 1 shows in longitudinal section a layer structure of a single cantilever 20 of a chip of a device of the invention, wherein the layer structure is prepared and structured preferably on one undivided wafer, before the wafer is separated into individual chips. For example, an SOI wafer (SOI stands for silicon-on-insulator) can serve as basis for production of the cantilever 20. Such an SOI wafer includes a thin silicon layer 10c of thickness, for example, 3 to 5 μm, which is separated from a silicon substrate 10a by an insulating layer 10b, for example, $SiO_2$. Applied on the thin silicon layer 10c is an insulating layer 10d. The insulating layer 10d can be, for example, a silicon oxide layer, which is preferably formed on the thin silicon layer 10c via a wet oxidation step. Optionally applied on the insulating layer 10d in a next manufacturing step is an adhesion-promoting layer 10e. The adhesion-promoting layer 10e can comprise, for example, aluminum nitride (AlN), which is preferably applied with a layer thickness of less than 50 nm.

Applied on the adhesion-promoting layer 10e is the piezoelectric transducer 30. The piezoelectric transducer 30 includes regions of a layer sequence of a first electrically conductive electrode layer 10f, which is applied on the adhesion-promoting layer 10e, a piezoelectric layer 10g, which is applied with a thickness of some 100 nm, for example, 500 nm, on the first electrode layer 10f, and a second electrode layer 10h, which is applied on the piezoelectric layer 10g. The electrode layers 10f, 10h can comprise platinum, for example, wherein the first electrode layer 10f has, for example, a thickness of, for instance, 20 to 30 nm, while the second electrode layer 10h has a thickness of, for instance, 150 to 250 nm. This layer structure is typical for the cantilever of the chips of the device of the invention.

Prepared on the free end of the cantilever element 20 in the two electrode layers 10f, 10h are yet a temperature sensor element 42 and a heating element 44. Such can occur, for example, by a lift-off process. Preferably, the electrode layers are, in such case, so structured that they have meander shaped structures as temperature sensor element, and heating element, wherein the heating element has a resistance of a few 100 ohm, while the resistance of the temperature sensor element amounts to 1 to 2 kiloohm. The length of the cantilever amounts to, for example, 300 to 500 μm, such that oscillation frequencies in the order of magnitude of 20 to 80 kHz result.

The temperature sensor element 42 and the heating element 44 are referred to together as thermal function block 40, which is separated from the piezoelectric transducer by an isolation groove having a width of some μm.

The entire surface of the chip is coated with a passivation layer 10i of aluminum oxide having a thickness of some 10 nm, for example, in an ALD process.

Optionally, a selectively adsorbing layer 10j can yet be deposited on the thermal function block above the passivation layer 10i, for example, a hygroscopic layer, such as a hydrogel, a zeolite or a silica gel. By influencing temperature with the heating element 44, the adsorption, or desorption, of a component can be controlled, wherein the adsorbed amount is ascertainable via the oscillation frequency of the cantilever.

For increasing sensitivity, the adsorbing layer 10j can also be deposited on the piezoelectric transducer 30, wherein then preferably also the region of the second electrode layer 10h, which forms an electrode of the piezoelectric transducer 30, is structured as heating element.

Figure 2:
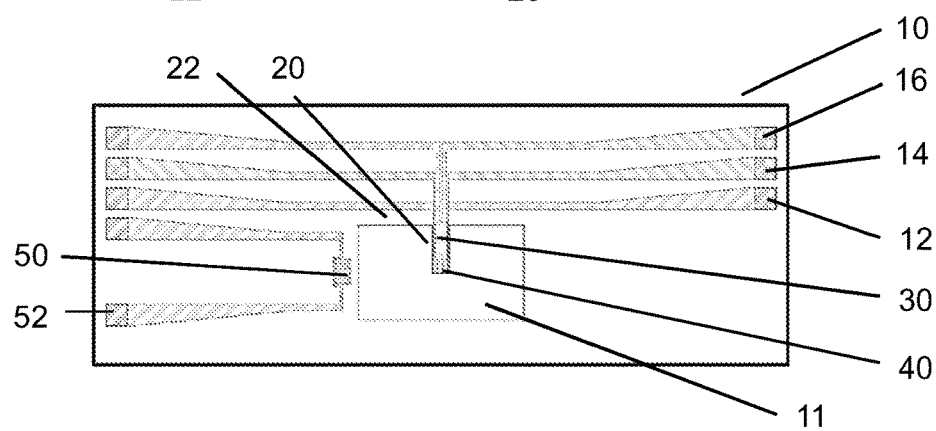
FIG. 2 shows a plan view of a chip of a first embodiment of a device of the present disclosure.

FIG. 2 shows a plan view of a chip 10, whose cantilever 20 is shown in FIG. 1. Cantilever 20 is freed by preparing a cavity 11, by means of DRIE. The temperature sensor element of the thermal function block 40 is contacted via a first conductive trace pair 12 prepared in the first electrode layer. The heating element of the thermal function block 40 is contacted via a second conductive trace pair 14 prepared in the second electrode layer. The electrodes of the piezoelectric transducer 30 are contacted via a third conductive trace pair 16, which has, in each case, one conductive trace in one electrode layer. A reference temperature sensor element 50 in the edge region 22 of the chip 10 and the fourth conductive trace pair 52 contacting it are prepared in the first electrode layer.

Figure 3:
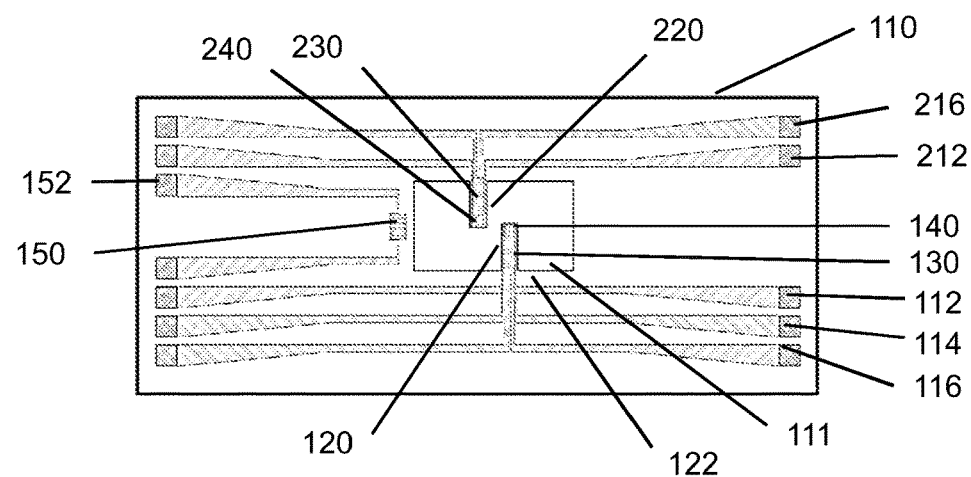
FIG. 3 shows a plan view of a chip of a second embodiment of a device of the present disclosure.

FIG. 3 shows a plan view of a chip 110, whose cantilevers 120, 220 are freed by preparing a cavity 111 by means of DRIE. The cantilevers have, in each case, a thermal function block 140, 240 and a piezoelectric transducer 130, 230. For the first cantilever 120, the following contacting schema is applied: The first temperature sensor element of the first thermal function block 140 is contacted via a first conductive trace pair 112 prepared in the first electrode layer. The heating element of the thermal function block 140 is contacted via a second conductive trace pair 114 prepared in the second electrode layer. The electrodes of the first piezoelectric transducer 130 are contacted via a third conductive trace pair 116, which has, in each case, one conductive trace in one electrode layer. For the second cantilever 220, the following contacting schema is applied: The second temperature sensor element of the second thermal function block 240 is contacted via a first conductive trace pair 212 prepared in the first electrode layer. The electrodes of the first piezoelectric transducer 230 are contacted via a third conductive trace pair 216, which, in each case, has one conductive trace in one electrode layer. A reference temperature sensor element 150 in the edge region 122 of the chip 110 and its contacting fourth conductive trace pair 152 are prepared from the first electrode layer.

Figure 4:
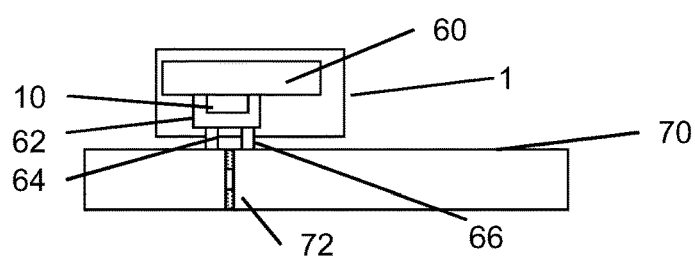
FIG. 4 shows a schematic longitudinal view of an example of an embodiment of an apparatus of the present disclosure.

FIG. 4 shows a typical construction of an example of an embodiment of the apparatus 1 of the invention connected to a pipeline 70, in order to analyze a gas mixture conveyed in the pipeline. Apparatus 1 comprises the above described chip 10, which is arranged in a sample chamber 62, which communicates with the pipeline 70 via connection lines 64, 66, wherein between connection points of the connection lines to the pipeline 70 there is arranged in the pipeline a diaphragm 72, which in the case of a volume flow through the pipeline effects a pressure gradient, which, in turn, effects a volume flow through the sample chamber 62, such that the chip is supplied always with a current, representative sample of the gas mixture. apparatus 1 includes, additionally, an evaluation and/or computer unit 60, to which the chip 10 is connected, and which is adapted, based on the oscillation characteristics of the at least one cantilever, to determine the density and viscosity of the gas mixture, and based on measured values of temperature of the first cantilever side temperature sensor element and the second temperature sensor element; as well as the power consumption of the heating element, to determine the thermal conductivity and/or specific heat capacity of the gas mixture. When a cantilever includes a functionalized surface, it is also possible to determine specifically the concentration of a component.

The special advantage of the invention lies especially therein that the thermal function blocks with temperature sensor and heating elements are so positioned relative to one another on the freely oscillating ends of oscillatable cantilever elements that a reliable measurement of the thermophysical parameters, such as thermal conductivity and heat capacity, of a gas mixture, which surrounds the cantilever, is possible with great accuracy. Since the mechanical properties of the gas mixture, thus, density and viscosity, are measured via oscillation frequency and oscillation damping of the oscillations of the same cantilever elements and thus practically at the same site, the various measurement data come from the identical sample in practically the same thermodynamic state. This enables highly accurate measuring with extremely small effort. Therewith, especially the method according to WO 2018 082 875 A1 can be implemented yet more exactly and cost effectively. Equally, the methods for measuring the thermal conductivity, and specific heat capacity, according to Woodfield et al. or Gustafsson et al., can be performed with significantly reduced effort. For the procedures for moisture measurement and determining concentration by adsorption of a component, reference is made to the as yet unpublished patent application DE 10 2019 123 874.9.

The invention claimed is:

1. A device for determining a thermal conductivity and/or a specific heat capacity of a gas mixture and a density and/or a viscosity of the gas mixture, the device comprising:
a chip prepared from a semiconductor wafer, the chip comprising an oscillatable first cantilever with a first piezoelectric transducer, which is configured to excite an oscillation of the first cantilever with a first frequency, wherein the chip includes a cavity, into which the first cantilever extends at an oscillatable free end section of the cantilever;
a first cantilever temperature sensor element adapted to measure a temperature of the gas mixture, having a temperature-dependent first resistance value, and disposed in the free end section of the first cantilever;
a second temperature sensor element arranged spaced from the first cantilever and having a temperature-dependent second resistance value adapted to measure the temperature of the gas mixture;
a first heating element disposed in the free end section of the first cantilever, wherein at least one portion of the cavity extends between the first heating element and the second temperature sensor element; and
an evaluation and/or computer unit, which is configured, based on oscillation characteristics of the first cantilever, to determine the density and viscosity of the gas mixture and, based on measured values of the temperature from the first cantilever temperature sensor element, the second temperature sensor element and a power consumption of the first heating element, to determine the thermal conductivity and/or specific heat capacity of the gas mixture.

2. The device of claim 1, wherein the chip is prepared from a silicon-on-insulator (SOI) wafer.

3. The device of claim 1, wherein the chip includes an oscillatable second cantilever with a second piezoelectric transducer, which is configured to excite an oscillation of the second cantilever with a second frequency, wherein the second cantilever extends at an oscillatable free end section into the cavity and can be exposed to the gas mixture.

4. The device of claim 3, further comprising a second cantilever temperature sensor element adapted to measure the temperature of the gas mixture, having a temperature-dependent third resistance value, and disposed in the free end section of the second cantilever.

5. The device of claim 3, further comprising a second heating element disposed in the free end section of the second cantilever.

6. The device of claim 1, wherein the chip defines an edge region, which surrounds the cavity, wherein in the edge region a reference temperature sensor element is disposed, wherein at least one section of the cavity extends between the reference temperature sensor element and the free end section of the cantilever.

7. The device of claim 6, wherein the evaluation and/or computer unit is adapted to use temperature measured values of the reference temperature sensor element as temperature measured values of the second temperature sensor element.

8. The device of claim 4, wherein the evaluation and/or computer unit is configured to use temperature measured values of the second cantilever temperature sensor element as temperature measured values of the second temperature sensor element.

9. The device of claim 1, wherein the evaluation and/or computer unit is adapted to determine the thermal conductivity of the gas mixture in steady state or in a transient method.

10. The device of claim 1, wherein the evaluation and/or computer unit is configured to determine the specific heat capacity of the gas mixture in a method with variable temperature of the first heating element, wherein temperature as a function of time is evaluated for the second temperature sensor element in reaction to temperature as a function of time for the first heating element as to ascertain a product of specific heat capacity and density of the gas mixture.

11. The device of claim 10, wherein in the method a step function response of the second temperature sensor element to a temperature step function of the first heating element is evaluated.

12. The device of claim 10, wherein temperature as a function of time for the second temperature sensor element is evaluated, including phase and amplitude, in reaction to a harmonic exciting of the first heating element.

13. The device of claim 10, wherein the evaluation and/or computer unit is adapted to determine specific heat capacity by division of the product by the density ascertained based on the oscillation frequency of the first cantilever.

14. The device of claim 1, wherein the first cantilever includes a functionalized surface for selective adsorption of a component of the gas mixture surrounding the device, wherein the evaluation and/or computer unit is adapted to influence the amount of the adsorbed component via the first heating element and, based on a measured frequency of the oscillating first cantilever relative to at least one reference frequency, to determine the amount of the adsorbed component.

15. The device of claim 14, wherein the selectively adsorbed component is water.

16. The device of claim 14, wherein the at least one reference frequency comprises a frequency of the first cantilever in a state of complete desorption of the selectively adsorbed component and/or a frequency of a non-functionalized cantilever.

17. The device of claim 1, wherein:
the chip has a function-dependent, structured layer sequence, which is prepared on the semiconductor wafer comprising an oxide layer, an adhesion-promoting layer, a first electrode layer, a piezoelectric layer, a second electrode layer and a passivation layer;
the piezoelectric transducer or the piezoelectric transducer regions comprise the first and second electrode layers and the piezoelectric layer;
the first cantilever temperature sensor element and the second temperature sensor element are each formed by structuring a region of one of the first and second electrode layers;
the first heating element is formed by structuring a region of the other of the first and second electrode layers;
the adhesion-promoting layer and the piezoelectric layer each include aluminum nitride;
the first and the second electrode layers each include platinum; and
the passivation layer includes aluminum oxide.

* * * * *